J. T. WILSON.
Bakers' Ovens.
No. 154,535.
Patented Aug. 25, 1874.
2 Sheets--Sheet 1.
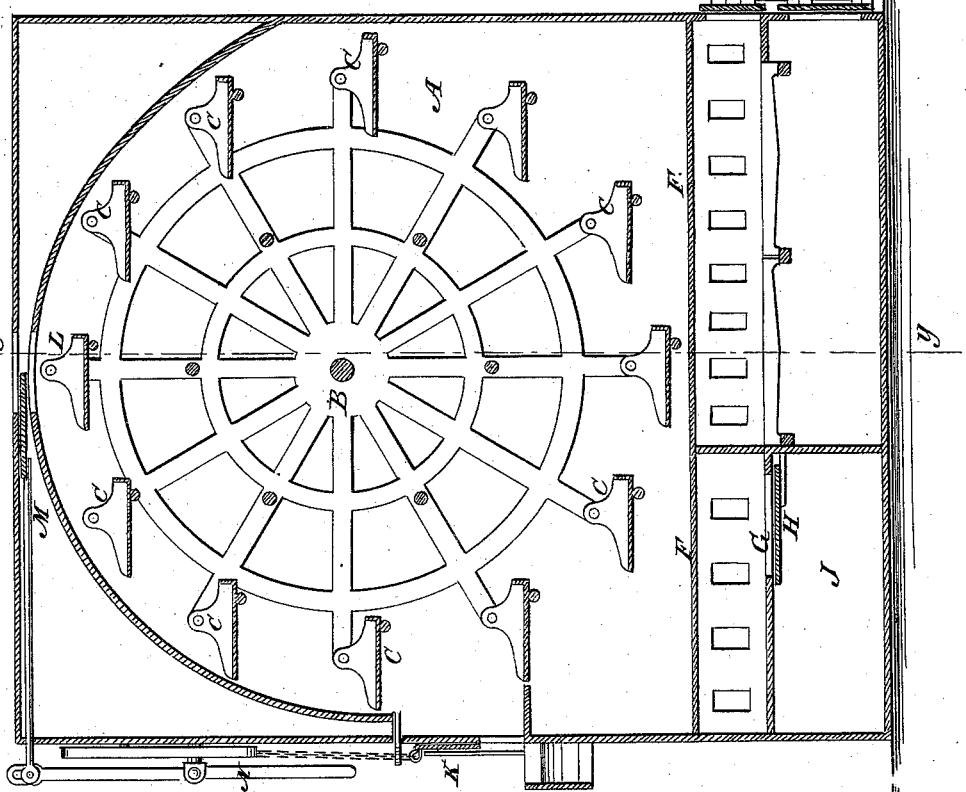
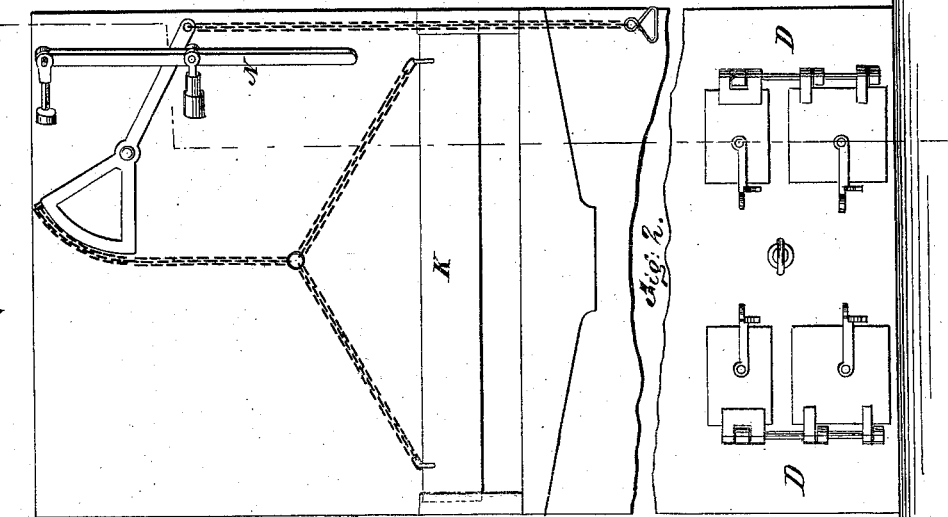
Witnesses:
James H. Hunter
K. Newell
Inventor:
John T. Wilson J. T. WILSON.
Bakers' Ovens.
No. 154,535.    Patented Aug. 25, 1874.
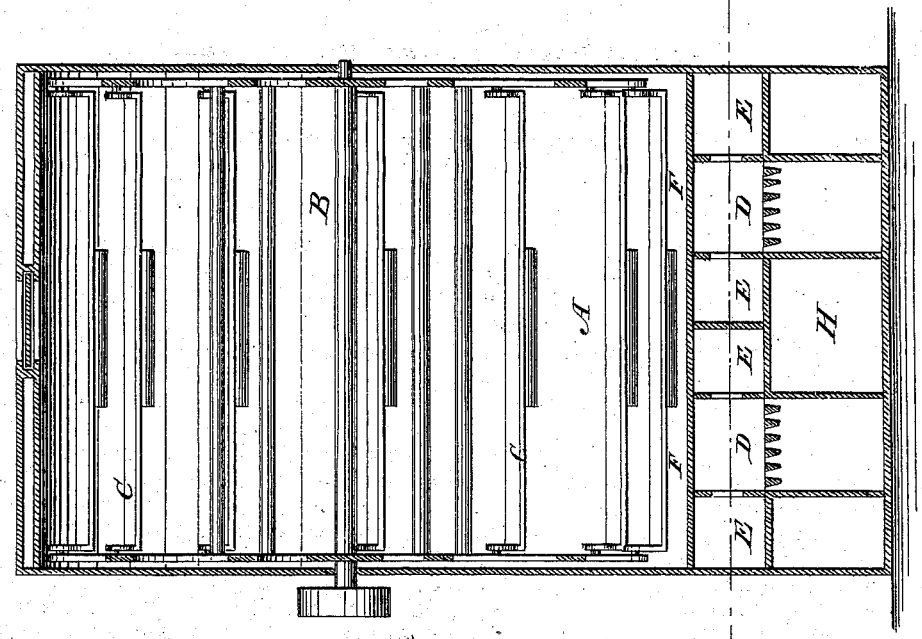
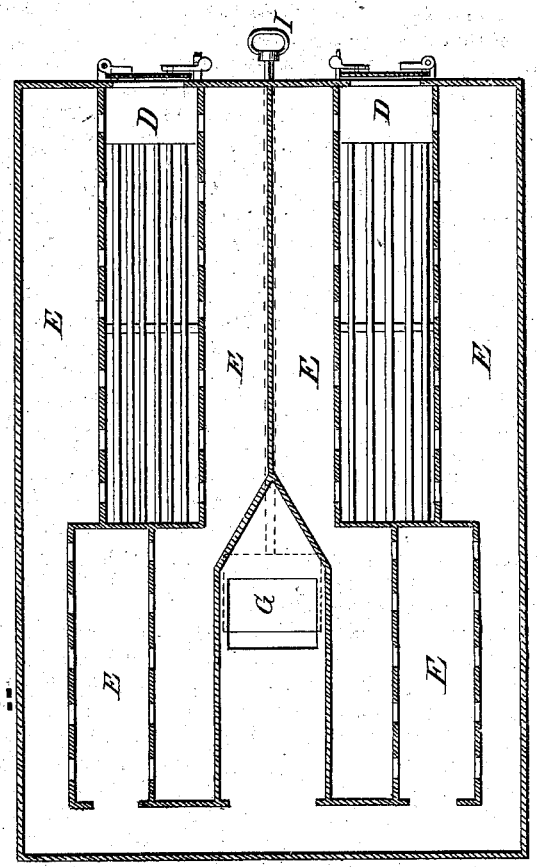
Witnesses:    Inventor:

UNITED STATES PATENT OFFICE.

JOHN T. WILSON, OF NEW YORK, N. Y.

IMPROVEMENT IN BAKERS' OVENS.

Specification forming part of Letters Patent No. 154,535, dated August 25, 1874; application filed April 18, 1873.

*To all whom it may concern:*

Be it known that I, JOHN T. WILSON, of the city, county, and State of New York, have invented a new and useful Improvement in Bake-Ovens; and do hereby declare that the following is a full, clear, and exact description of the same, reference being had to the accompanying drawings forming a part of this specification.

Ovens or baking-chambers have been constructed with a series of bread-receiving shelves or carriers suspended or swinging from a reel, the heat being radiated from the whole interior surface of the chamber onto such revolving bread-carriers. Ovens or baking-chambers have also been constructed with an oval bread-carrier, the products of combustion passing through said oven direct from the furnace, and from thence passing out at the top to the stack or chimney. Ovens or baking-chambers have also been constructed with a series of bread-receiving shelves or carriers suspended from a reel, as in the first above-referred-to class, the products of combustion passing through said oven, as in the second above-referred-to class.

In the first class the flues were exterior and on all sides of the oven. In the other classes the oven itself formed the flue for the passage of the products of combustion to the stack or chimney. It has been found that in the first referred-to class of ovens or baking-chambers the heat was more uniform and more equalized than in either of the following classes, but not in any of them as concentrated as desired.

The present invention relates to a combination of elements, by the use of which the objectionable features of all of the above-referred-to classes will be obviated. It consists of a series of bread or cracker receiving shelves or carriers suspended or swinging from a reel revolving within an oven or baking-chamber, a furnace, and an intervening series of flues between the bottom of said oven and the furnace, whereby the heat is confined wholly at the bottom of the oven, and radiated to the revolving bread-receivers from the interior surface of such bottom. By thus receiving radiated heat from the interior surface of the bottom a highly-uniform and concentrated heat is obtained without danger of injury from too quick an action of the heat on the bread, as is the case when the products of combustion from the furnace are passed into and through the chamber or oven within which the bread-carriers move.

The process of baking the dough in the first class of ovens above referred to is too slowly carried on. In the second and third classes there is too sharp and quick an action of the heat on the interior of the dough, which invariably leaves the interior in an inferior condition. There is also an injurious effect produced on the bread by the smoke, gases, cinders, and ashes which proceed from the furnace into the oven or baking-chamber. The products in their passage also dissipate and carry off certain alcoholic vapors arising from the dough, which, together with their chemical reactions, it is desirable to retain in the oven during the process of baking.

With an oven and furnace, and flues under the bottom, as herein set forth, I am enabled to get a body of strong but uniform and concentrated heat to act upon the dough, and there is also hereby secured a constantly-ascending current of heated air, through which the bread and crackers are caused to descend, and thus gradually approach the hottest point, when the baking process is completed; and the result is a quick, and at the same time a through-and-through baking of such dough, leaving it, when baked, in a uniform condition throughout, and without injury from gases, dust, cinders, smoke, &c. The baked bread and crackers are also improved by the retention in the baking-chamber during the process of baking of the alcoholic vapors, &c., above referred to.

In the drawings, Figure 1 is an exterior view of one side of a baking-oven constructed according to my invention, the lower portion shown broken away. Fig. 2 is an exterior view of the opposite side, the upper portion shown broken away. Fig. 3 is a vertical central section through line $x\,x$ of Fig. 1. Fig. 4 is a central vertical section through line $y\,y$ of Fig. 3. Fig. 5 is a horizontal section in the plane of the line $z\,z$ of Fig. 4.

A is the oven or baking-chamber, which may be composed of any suitable material. B is the reel, to the outer ends of the radial arms of which are suspended bread-carriers C C, &c. D D is the furnace. E E are flues, through which the products of combustion pass beneath the bottom F of the oven until they reach the passage G, controlled by a damper, H, connected with a rod and handle, I, through which they pass to the trunk-flue J, through which last-mentioned flue they continue to the stack or chimney. The flues beneath the bottom of the oven may be arranged in any convenient or desired way, and there may be one or more grates and fire-boxes in the furnace for generating the products of combustion. The bread or crackers are inserted through an opening closed by a door at K, or at any other convenient point. An escape for the heat radiated into the oven is placed at L, which may be opened more or less in case the oven is overheated. This opening is controlled by a damper, M, connected with a hand-lever, N.

I claim—

The combination of an oven or baking-chamber containing swinging bread-carriers, suspended from the arms of a revolving reel, with a flue or flues located beneath, and confined to the bottom of such oven or chamber, and a furnace, substantially as described.

JOHN T. WILSON.

Witnesses:
JAMES H. HUNTER,
K. NEWELL.